United States Patent
Okano

(10) Patent No.: US 10,837,660 B2
(45) Date of Patent: Nov. 17, 2020

(54) VENTILATING AIR CONDITIONING APPARATUS

(71) Applicant: SEIBU GIKEN CO., LTD., Fukuoka (JP)

(72) Inventor: Hiroshi Okano, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 166 days.

(21) Appl. No.: 16/051,551

(22) Filed: Aug. 1, 2018

(65) Prior Publication Data

US 2019/0041072 A1    Feb. 7, 2019

(30) Foreign Application Priority Data

Aug. 1, 2017 (JP) .................. 2017-149419

(51) Int. Cl.
| | |
|---|---|
| *B01D 53/06* | (2006.01) |
| *F24F 3/16* | (2006.01) |
| *F24F 13/28* | (2006.01) |
| *F24F 11/00* | (2018.01) |
| *F24F 13/32* | (2006.01) |

(Continued)

(52) U.S. Cl.
CPC ............ *F24F 3/1603* (2013.01); *B01D 53/04* (2013.01); *B01D 53/06* (2013.01); *F24F 11/0001* (2013.01); *F24F 13/28* (2013.01); *F24F 13/32* (2013.01); *B01D 2253/102* (2013.01); *B01D 2253/206* (2013.01); *B01D 2257/504* (2013.01); *B01D 2259/4508* (2013.01);

(Continued)

(58) Field of Classification Search
CPC .. B01D 53/04; B01D 53/06; B01D 2253/102; B01D 2253/206; B01D 2257/504; B01D 2259/4508; F24F 11/0001; F24F 13/28; F24F 13/32; F24F 3/1603; F24F 2110/66; F24F 2110/70; F24F 2203/026; F24F 2203/10
USPC ...... 96/111, 124–128, 150; 423/230; 95/113, 95/139
See application file for complete search history.

(56) References Cited

U.S. PATENT DOCUMENTS 3,865,924 A * 2/1975 Gidaspow ............. B01D 53/02
                                                           423/230
6,447,583 B1 * 9/2002 Thelen ................... B01D 53/06
                                                           95/113

(Continued)

FOREIGN PATENT DOCUMENTS

| JP | 5-68290 | 9/1993 |
|---|---|---|
| JP | 2003-19435 | 1/2003 |

(Continued)

*Primary Examiner* — Frank M Lawrence, Jr.
(74) *Attorney, Agent, or Firm* — Staas & Halsey LLP

(57) ABSTRACT

A ventilating air conditioning apparatus has energy efficiency without energy loss associated with ventilation, has high space, saves space, and is low cost. The ventilating air conditioning apparatus has a honeycomb rotor having a function of adsorbing or absorbing contaminants such as carbon dioxide. The honeycomb rotor is disposed in a rotor rotating device having at least a process zone and a desorption regeneration zone. The processed air is passed through the process zone to remove contaminants such as carbon dioxide and the air is supplied. Saturated steam is introduced into the regeneration desorption zone to desorb contaminants such as carbon dioxide and is discharged to outdoors.

21 Claims, 13 Drawing Sheets

(51) Int. Cl.
    *B01D 53/04*     (2006.01)
    *F24F 110/70*     (2018.01)
    *F24F 110/66*     (2018.01)

(52) U.S. Cl.
    CPC ....... *F24F 2110/66* (2018.01); *F24F 2110/70* (2018.01); *F24F 2203/026* (2013.01); *F24F 2203/10* (2013.01)

(56) References Cited

U.S. PATENT DOCUMENTS

| | | | | |
|---|---|---|---|---|
| 2001/0009124 | A1* | 7/2001 | Suzuki | B01D 53/06 95/113 |
| 2010/0251887 | A1* | 10/2010 | Jain | B01D 53/047 95/46 |
| 2012/0000365 | A1* | 1/2012 | Okano | B01D 53/261 96/144 |
| 2012/0068119 | A1* | 3/2012 | Kametani | B01D 53/06 252/372 |
| 2014/0175336 | A1* | 6/2014 | Gupta | C07C 7/12 252/373 |
| 2015/0010452 | A1* | 1/2015 | Elliott | B01D 53/06 423/230 |
| 2019/0193019 | A1* | 6/2019 | Okano | B01D 53/72 |

FOREIGN PATENT DOCUMENTS

| | | |
|---|---|---|
| JP | 2005-98571 | 4/2005 |
| JP | 2006-61758 | 3/2006 |
| JP | 2007-37670 | 2/2007 |
| JP | 5627870 | 10/2014 |
| JP | 5877922 | 2/2016 |

\* cited by examiner

VENTILATING AIR CONDITIONING APPARATUS

CROSS-REFERENCE TO RELATED APPLICATIONS

This application is based on and hereby claims priority to Japanese Patent Application No. 2017-149419 filed on Aug. 1, 2017, the contents of which are hereby incorporated by reference.

BACKGROUND

The present invention relates to a ventilating air conditioning apparatus for removing contaminants such as carbon dioxide, which can raise the quality of indoor air with less ventilation by using a rotor capable of adsorbing and removing, for example, the contaminants such as carbon dioxide, VOC, odor, or the like generated inside the room or the contaminants such as SOx, NOx and VOC entering from outside air so as to remove the contaminants.

The ventilating air conditioning apparatus as shown in FIG. 1 used for an operating building, a business complex and habitation space is used in order to discharge contaminants such as the carbon dioxide which is mainly contained in people's expiration and VOC which generates from building materials and OA equipment, etc.

When ventilation is performed during cooling and heating, since the cooling/heating load increases, a total heat exchanger is used for the ventilation duct, and exhaust heat is recovered by heat exchange of return air and exhaust.

Rotor type and stationary type are mainly used as such total heat exchangers. When outside air volume ratio is 1:1 in exhaust gas, total heat exchange efficiency is about 70% in the rotor type, and the total heat exchange efficiency is about 50% in the compact stationary type. That is, even if the energies thrown away by all the heat exchange are collected, 30 to 50% of energy is thrown away vainly. As to such total heat exchangers, each large-sized duct of an air supply system and an exhaust system is required. Therefore, there is a demerit of which the exchangers occupy the expensive valuable space of a building, and there are several problems that duct piping becomes long if an open air introduction place is still further, that a cost of construction also increases, that ventilation power also increases and that setting position also has restrictions.

Furthermore, in recent houses, each room has independent air-conditioning facilities, a ventilating fan is provided for each room, and ventilation is performed through ducts passed from the respective ventilators to the ceiling back side. Such a duct may be a long pipeline, and in such a case, the air resistance is large. Therefore, the energy required for ventilation also increased, which wasteful energy due to ventilation, resulting in poor overall energy efficiency.

SUMMARY

In response to the above problem, as disclosed in Patent Document 1, Japanese Patent Laid-Open Publication No. 2005-98571, a ventilator which is operated when the concentration of carbon dioxide in a room becomes a certain value or more has been developed. However, this still does not sufficiently reduce the loss of cooling and heating energy associated with ventilation.

Therefore, as shown in Patent Document 2, Japanese Patent Laid-Open Publication No. 2007-37670, a deodorizing device having a filter for adsorbing and decomposing harmful gas in the air has been developed. However, this type of device can not remove carbon dioxide, and since it is necessary to replace the filter, there is a problem that the filter replacement cost is added separately.

Patent Document 3, Japanese Patent Laid-Open Publication No. 2003-19435, discloses a device using an adsorption rotor carrying an absorbent capable of sorbing and desorbing carbon dioxide such as potassium oxide. The device sorbs carbon dioxide from indoor air, desorbs carbon dioxide with hot air in the regeneration zone, and exhausts it outdoors.

Patent Document 4, Japanese Patent Laid-Open Publication No. 2006-61758, discloses a device using a sorption rotor in which a rotor is loaded with an ion exchange resin or a complex having a functional group that selectively sorbs and desorbs carbon dioxide. The device sorbs carbon dioxide from indoor air, desorbs carbon dioxide with hot air in the regeneration zone, and exhausts it outdoors However, in principle, all of the carbon dioxide sorption devices disclosed in these documents adsorbs and removes water vapor as well as carbon dioxide. Because it is humid in the summer, comfort will increase if you can dehumidify. However, when dehumidifying is performed in the interim or winter season, indoor air must be too dry and it is need to be humidified. For that reason, there was a problem that there was no merit for utilization other than summer.

Further, in consideration of each heat resistance of the carbon dioxide adsorbent and the rotor, and for the purpose of achieving energy saving, low temperature exhaust of about 40 to 80° C. (hereinafter all temperatures are referred to as "Celsius") of low energy density is used. In order to achieve the required performance, it is necessary to take in and exhaust the same amount of regeneration air as the amount of air to be processed. Therefore, since a relatively large rotor is required, there is a disadvantage that the installation space is large, and the cost is also high. In addition, since large ducts for regeneration air intake and for exhaust are required, there is a disadvantage that wasteful occupation of expensive valuable space of a building is required. Also, unless outside air intake and exhaust is easy, the duct piping becomes longer and the construction cost also increases. In addition, there are problems such as an increase in air blowing power, and additionally, there are restrictions on installation location.

Patent Document 5, Japanese Examined Patent Publication No. 5-68290, discloses an example of a carbon dioxide removing apparatus used in a closed space of a space station or the like. The air to be processed is allowed to flow through an adsorption layer filled with an adsorbent (amine type ion exchange resin, activated carbon, etc.), and carbon dioxide in the air is removed to supply. The filled layer of the adsorbent adsorbing carbon dioxide desorbs carbon dioxide by switching the valve to introduce water vapor. When the desorption is completed, it is operated in a batch mode, the valve is switched again to introduce the air to be processed, adsorb carbon dioxide, and supply the air from which carbon dioxide has been removed. This method is applicable to a small space such as a space station, but it is difficult to adapt to general air conditioning because it is difficult to enlarge it and has high initial cost and running cost. Therefore, the method is difficult to adapt for general air conditioning.

In the proposal scheme disclosed in Patent Document 6, Japanese Patent No. 5627870, a honeycomb rotor carrying powder of a sorption material such as an ion exchange resin capable of adsorbing carbon dioxide is used so as to be adaptable also to ordinary air conditioning. In this scheme, as shown in FIG. 2, the air to be processed, the air cooled and dehumidified through the evaporator of the heat pump is further passed through a honeycomb rotor to sorb and remove contaminants such as carbon dioxide to supply air. Meanwhile, in the regeneration zone, air that has been heated through the condenser is allowed to pass through, so that contaminants such as carbon dioxide adsorbed on the rotor are desorbed and discharged to the outside air. This proposal makes it possible to process the air volume by using the honeycomb rotor and ensures energy saving by utilizing exhaust heat by a combination of the heat pump.

Patent Document 7, Japanese Patent No. 5877922, discloses a scheme for increasing the separation efficiency of carbon dioxide by providing humidity adjustment so that the enthalpy of the regeneration entrance is higher than the enthalpy of the processing entrance. However, in any of the schemes of Patent Document 6 and Patent Document 7, since air using low-temperature waste heat having low regeneration effect is used, the shortage of regeneration energy is supplemented by the regeneration air flow rate. Therefore, almost the same amount of regenerating desorption air as the air to be processed is required. Therefore, as shown in Table 1, since the rotor diameter is increased, it is difficult to reduce the size of the device, two large air flow blowers are required, and the air blowing running cost increases. In addition, air supply and exhaust ducts for large-area detachable regeneration are also required, which has the disadvantage of occupying much of the valuable space of the building.

TABLE 1

Comparison of rotor diameter against process air volume

|  | Prior art | Flow volume (N m3/h) Embodiment |
|---|---|---|
| Zone rate Process:Regeneration | 1:1 | 1:(0.1) |
| Process air volume | 30,000 | 30,000 |
| Regeneration air volume | 30,000 | — |
| Hopper air volume | — | 70~900 |
| Total air volume | 54,000 | 30,900 |
| Regeneration temperature (° C.) | ~60 | ~60~ |
| Rotor diameter conversion | φ 3.0 m | φ 2.1 m |

Since carbonate such as zeolite, activated carbon, amine compound, amine type ion exchange resin, potassium carbonate and the like having carbon dioxide adsorption property or sorption property all have hygroscopicity, and also, since the relative humidity of the air for regeneration desorption is lowered by heating normally, the moisture of the rotor is desorbed in the regeneration zone, and the passing air is dehumidified in the process zone. In the summer season, there is also the merit of dehumidifying. However, in summer, since the supply air temperature rises due to adsorption heat of dehumidification, there is a disadvantage that it can not be supplied to the room unless it is re-cooled with a vaporization cooler or an after-cooler provided at the rotor process outlet.

In addition, as shown in FIG. 6, the sorption performance of carbon dioxide tends to be inhibited by the temperature rise due to adsorption heat of dehumidification. Also, in the desorption/regeneration zone, regeneration energy is consumed in the heat of desorption of water vapor. Therefore, there is a disadvantage in terms of performance that the separating performance of carbon dioxide is deteriorated.

Furthermore, in the winter, humidification is required more, and this dehumidification function is disadvantageous. Also, because there is no extra waste heat, driving in winter is not appropriate. In other words, there is a fundamental disadvantage that it can be utilized only in the summer.

In order to solve the above problem, the present invention has a honeycomb rotor having adsorption function or absorption function of contaminants such as carbon dioxide and VOC gas in a wet state. Since this rotor can remove and purify carbon dioxide and contaminants in the air, indoor air quality can be secured while suppressing energy loss with a minimum amount of ventilation. In addition, since this rotor is desorbed and regenerated with small capacity saturated steam, it is possible to drastically reduce the size of the rotor and the device as shown in Table 1. In addition, since the amount of air supply and the amount of exhaust required in the conventional ventilating air conditioner can be remarkably reduced, the installation space of the air conditioner and the duct can be reduced, and the valuable space occupied by the duct and installation cost can be suppressed. Accordingly, the present invention provides a ventilating air conditioning apparatus with space saving, low cost, and energy saving.

Since the ventilating apparatus according to the present invention is constructed as described above, contaminants such as carbon dioxide, odor and VOC generated inside the room, VOC, SOx, NOx entering from the outside air are adsorbed (sorbed) to the honeycomb rotor at the same time, then desorbed with saturated steam in the desorption zone and released to the outside air. Here, when the ventilation amount is reduced, the oxygen in the indoor air gradually decreases, but the oxygen concentration in the air is about 21%, and the decrease of about 1 to 2% of the concentration has no effect on human breathing at all. Also, since oxygen is supplied by people coming in and out from the door and diffusing from gaps due to oxygen concentration difference, it is practically no problem. Conversely, 1 to 2% of oxygen is consumed by human breathing, and as a result, 1 to 2% of the generated carbon dioxide will have harmful effects on the human body if it is not removed.

Regarding the concentration of carbon dioxide, its tolerance is said to be 0.1% by Building Standard Law, (tolerance 0.5% by the National Occupational Safety and Health Research Institute and the US Industrial Sanitation Experts Conference). Since the concentration of carbon dioxide increases only slightly in the air and affects human health, ventilation of 30 m 3/H per person in a room is required according to the design standard of the Building Standards Law. However, the concentration of carbon dioxide in the outside air has gradually risen in recent years, and with the ventilation of 30 m 3/H, indoor carbon dioxide concentration 0.1% can not be achieved. The main purpose of ventilation is to reduce the concentration by exhausting VOCs generated from building materials, furniture, office automation equipment, etc. and contaminants generated by smoking. Therefore, even if the ventilation volume is 30 m 3/H or less, if it can be maintained below the reference value by discharging carbon dioxide and contaminants such as VOC from the interior, there is no problem according to the operation standard of Building Standards Law.

Furthermore, the proposed method and apparatus use a honeycomb rotor having adsorption and desorption functions of contaminant gases such as carbon dioxide and VOC. Therefore, as in an air cleaning apparatus using a filter, there is no member to be frequently exchanged, and expenditure expense for consumable supplies can be reduced.

In particular, in recent years, air pollution caused by particulate matter PM 2.5 and photochemical smog etc. has been occurring one after another in metropolitan areas. In such a case, it is concerned that PM 2.5 and photochemical smog enter the room by performing ventilation. In such a case, it is concerned that PM 2.5 and photochemical smog enter the room by performing ventilation. Also, due to the ventilation, there is a possibility that automobile exhaust gas will flow into the houses along the main road, and odor from the cooking exhaust will enter the room in the downtown area. However, the proposed ventilating apparatus has no such problem because the amount of ventilation is small. Even if the exhaust gas or odor enters the room, those gases and odors are adsorbed, concentrated, and exhausted by the proposed apparatus.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENTS

Figure 1:
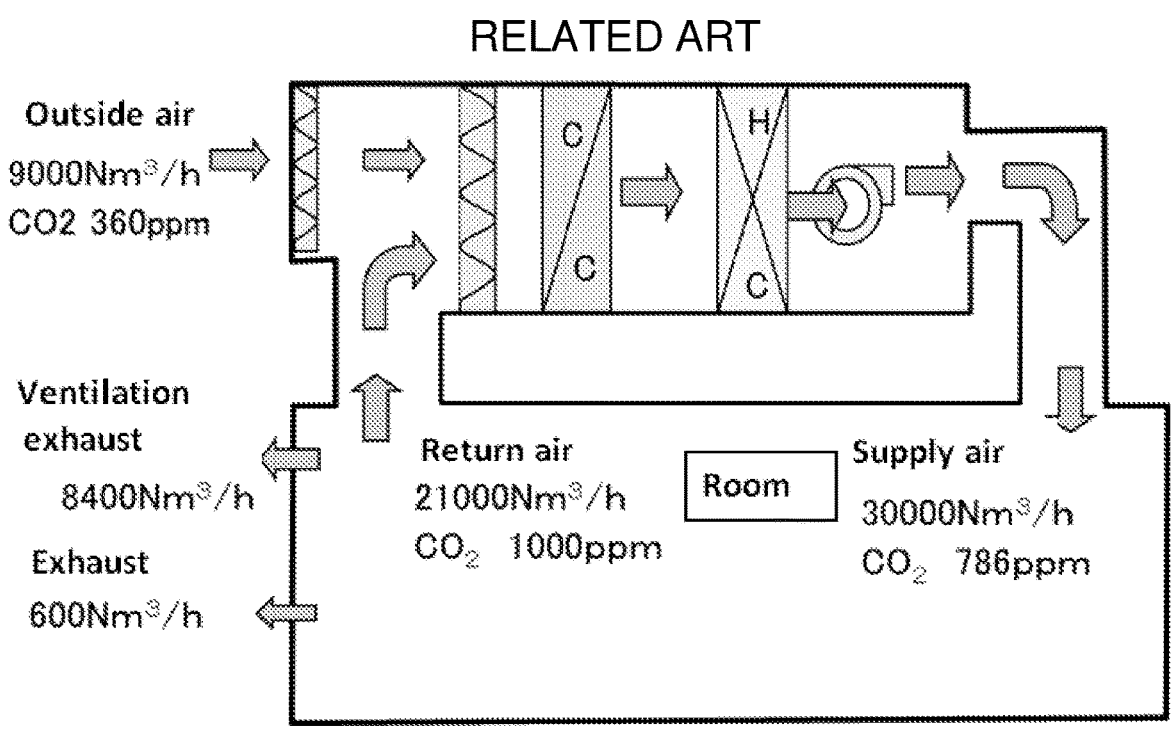
FIG. 1 is a flow of the conventional example of a ventilating air conditioner.
Figure 2:
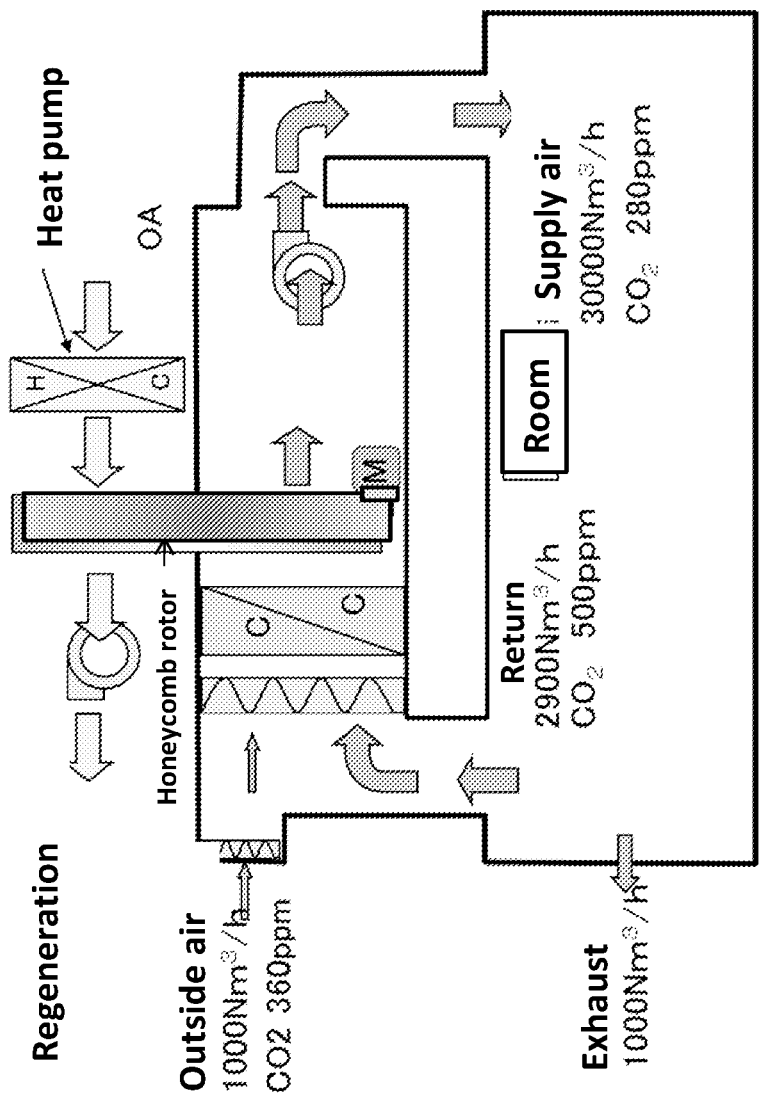
FIG. 2 is a flow of the conventional example of a ventilating air conditioner shown in Patent Document 6.

Reference will now be made in detail to the embodiments, examples of which are illustrated in the accompanying drawings, wherein like reference numerals refer to the like elements throughout. The embodiments are described below to explain the present invention by referring to the figures.

Characteristics of the proposed ventilating air-conditioning method or apparatus are as follows. First, it has a honeycomb rotor having a function of adsorbing or absorbing contaminants such as carbon dioxide and VOC gas in a wet state. The honeycomb rotor is disposed in a rotor rotation drive device having at least a process zone and a desorption regeneration zone. An air to be processed is passed through the process zone to remove contaminants such as carbon dioxide and air is supplied while saturated steam is introduced into the regeneration desorption zone. As a result, the air to be processed desorbs carbon dioxide and contaminants and is discharged to the outdoors.

An adsorption phenomenon differs from an absorption phenomenon strictly. However, these phenomena are similar each other, and the word "sorption" may be used in a case where there are a common element in these phenomena. Therefore, the word "sorption" is used in this proposal document. Amine carbon dioxide absorbent can be regarded to be an absorbent, but amine based ion exchange resin has pores filled with water when it contains water. Therefore, the amine-based ion exchange resin is thought to be an adsorbent that carbon dioxide sorbs to the amine group on the pore surface by diffusing in the pores. In addition, an adsorbent obtained by impregnating an absorbent such as an amine solution or an ionic liquid into the pores of the porous solid adsorbent is also included therein. In any case, it is a major point of the proposal to use a honeycomb rotor incorporating small diameter particles having the function of sorbing contaminants such as carbon dioxide in a water-insoluble and solid wet state under the operating principle.

Figure 8:
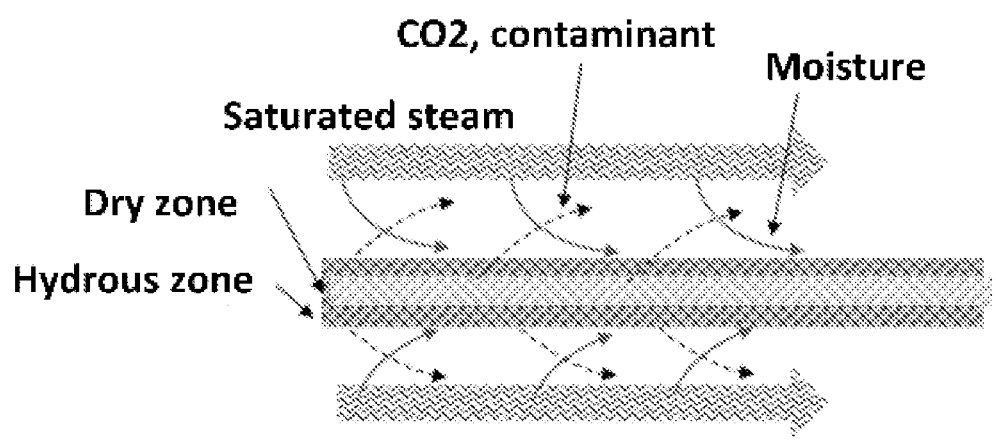
FIG. 8 is a figure showing the honeycomb surface at the time of saturated vapor desorption reproduction.

When air to be processed is made to flow through the process zone of the honeycomb rotor, the honeycomb removes contaminants such as carbon dioxide and supplies clean air. A honeycomb rotor which has sorbed contaminants such as carbon dioxide moves to the desorption zone by the rotation of the rotor. In the desorbed zone, saturated steam is introduced and contaminants such as carbon dioxide are desorbed. As shown in FIG. 8, the saturated steam introduced into the rotor honeycomb from the desorbing zone is cooled and condensed due to heating of the honeycomb and desorption heat supply of contaminants such as carbon dioxide, and dew condensation on the inner surface of the honeycomb. By the rotation of the rotor, the inner surface of the honeycomb moves to the process zone while being wet with the condensed dew water. As the advantages, when the air to be processed passes through the process zone, the cooling of the honeycomb is promoted by the vaporization cooling phenomenon of dew condensation water, and the carbon dioxide gas and pollutant gas are sorbed effectively by cooling and removing the sorption heat of the carbon dioxide gas.

Figure 10:
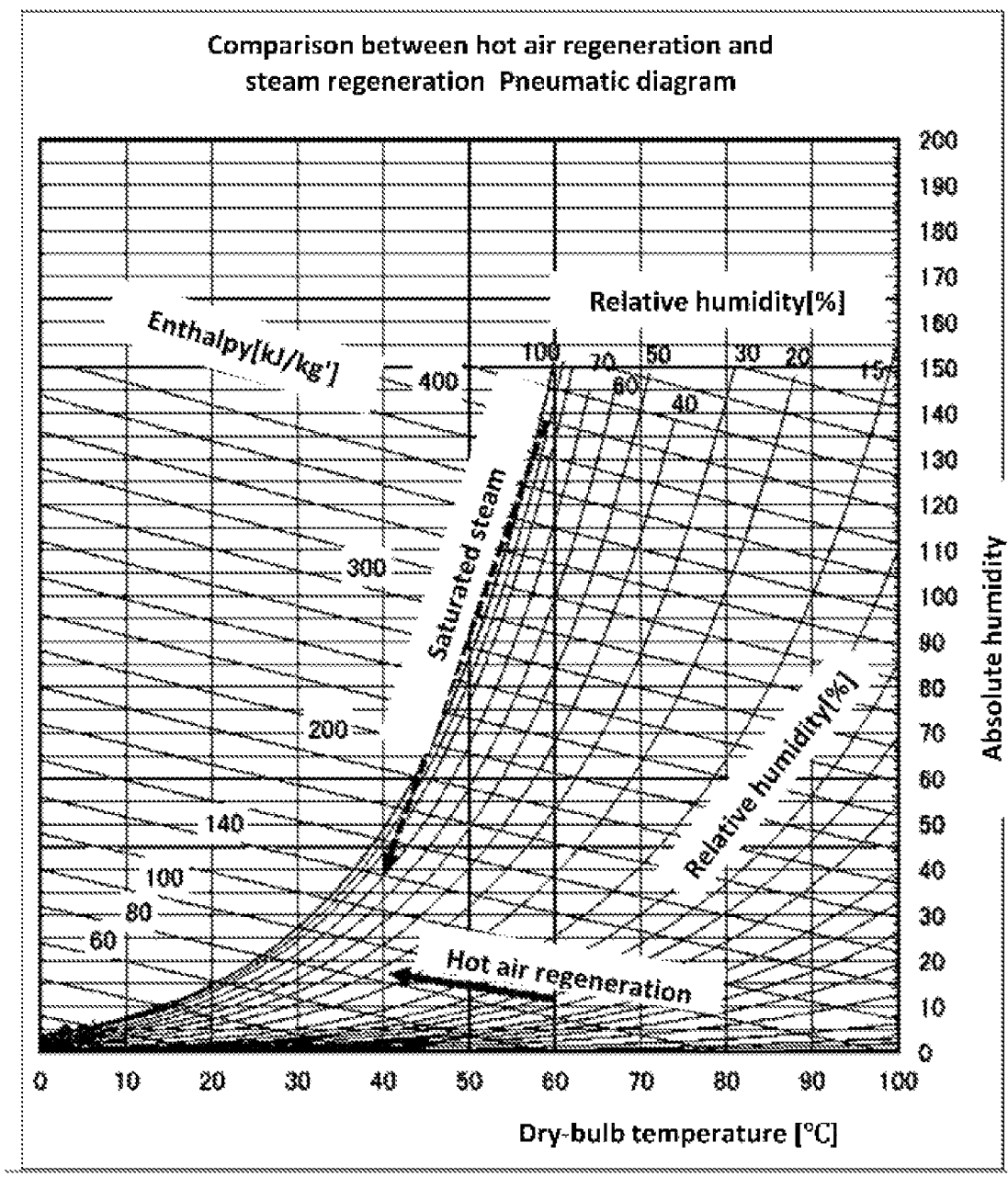
FIG. 10 is an air diagram which compared warm air reproduction with saturated vapor reproduction.

Furthermore, it is possible to reduce desorbed air volume and ventilation air volume by concentrating, desorbing and evacuating contaminated gases such as carbon dioxide and VOC with saturated steam at a high energy density and a small capacity at 60 to 100° C. For example, as shown in FIG. 10, saturated steam at 60° C. has enthalpy of ten and several times as much as the enthalpy for heating air at 35° C. and 50% RH to 60° C. Therefore, the saturated steam can be desorbed and regenerated in a fraction of a tenth, and as shown in Table 1, the rotor can be downsized, the exhaust can be taken in, and the outside air can be drastically reduced. Furthermore, the air supply and exhaust ducts are the minimum of the Building Standards Law, and if it can be secured indoor air quality in operation, the ventilation volume can be drastically reduced, so the blowing energy will be reduced. In addition, since the cooling and heating energy is not lost by the ventilation of a large amount of air, energy saving performance is improved. 30-50% of energy can not be collected but lost even when exhaust heat is recovered by the total heat exchanger. However, in the proposed ventilating apparatus, contaminants such as carbon dioxide and VOC in the room are concentrated and exhausted. Therefore, energy saving effect exceeding the total heat exchanger is expected.

Here, the saturated steam basically has an atmospheric pressure of 40 to 100° C. or less. The saturated steam introduced into the desorption zone is cooled and condensed by heating of the honeycomb or desorption heat supply of carbon dioxide and dew condenses on the honeycomb surface. The surface of the honeycomb moves to the process zone by rotation of the rotor while remaining wet with dewed water. As an effect, in the process zone, by accelerating the cooling of the honeycomb by the vaporization cooling phenomenon of dew condensation water by passage of the air to be processed and removing and cooling the sorption heat of the carbon dioxide gas, the honeycomb exhibits the effect of efficiently sorbing the carbon dioxide gas and contaminant gas in the air to be processed. In other words, the proposed apparatus utilizes high enthalpy due to saturated steam instead of displacement by desorption with steam.

As the solid water insoluble amine type carbon dioxide sorbing material, in addition to a basic ion exchange resin having an amine group, a polymer gel having an amine group, or an amine type carbon dioxide absorbent or carbonate, an adsorbent such as silica gel, activated carbon, activated alumina, mesoporous silica or the like in which a carbon dioxide absorbent such as an ionic liquid is impregnated in the pores can be used. In the case where the carbon dioxide sorption performance is impaired by immersing in the pores of the adsorbent, the surface of the adsorbent can be rendered water repellent to prevent water penetration into the pores. However, since it is a micropore, we can achieve the object with weak water repellency. Conversely, with strong water repellency, the condensed water avoids the surface of the sorptive material, and the water drop increases in diameter. As a result, the vaporization cooling effect decreases, which is undesirable.

Figure 9:
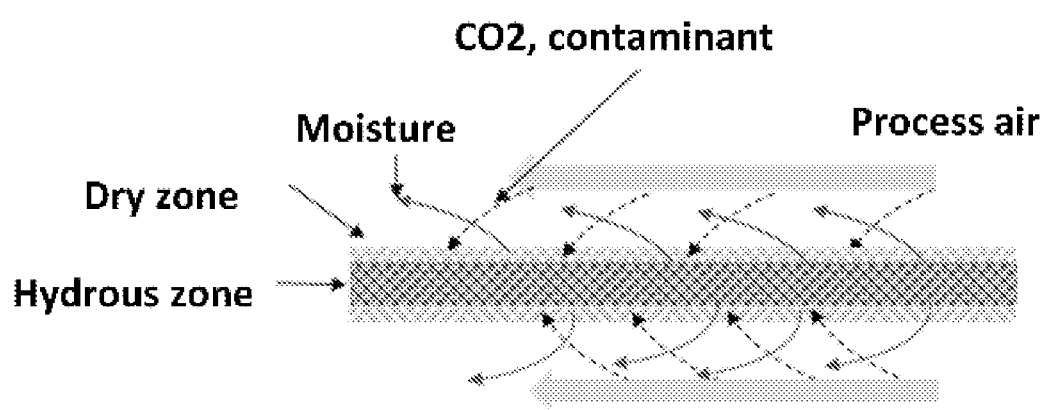
FIG. 9 is a figure showing the honeycomb surface at the time of evaporative cooling sorption.
Figure 13:
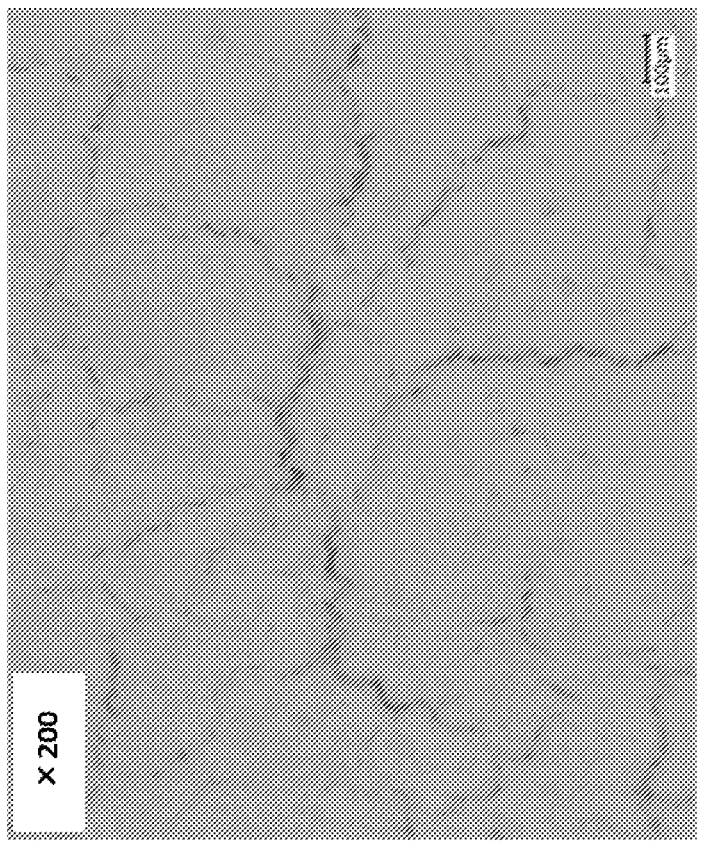
FIG. 13 is a figure showing the microphotograph of the surface of the sheet of 1 mm or less in which the slurry in which micro particles of weakly basic ion exchange resin of 0.1 mm or less and a binder are mixed is coated on the porous glass fibrous sheet of 0.1 mm or less of weakly basic ion-exchange resin.
Figure 13:
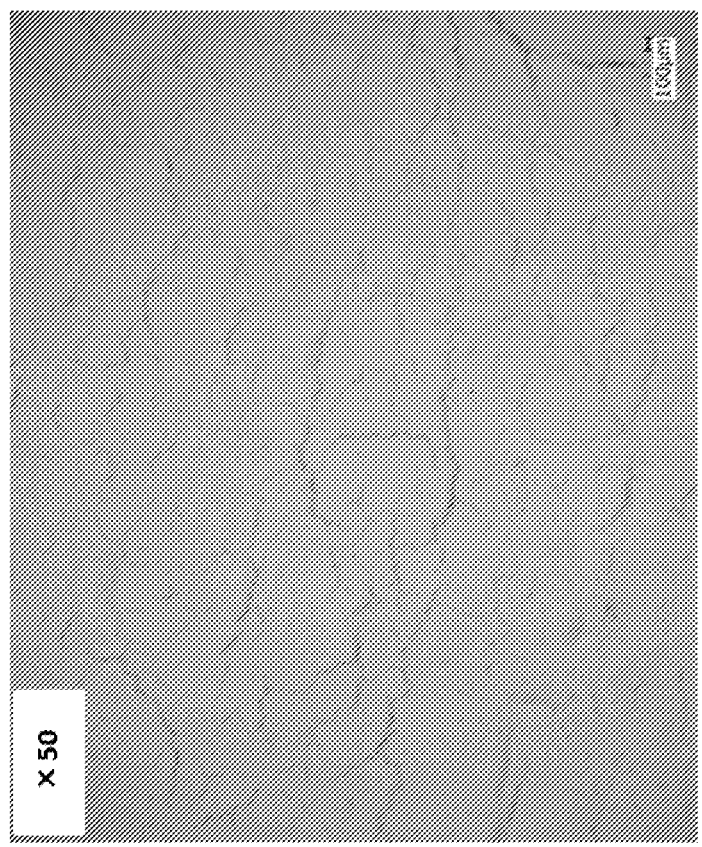

As an example, a porous glass fiber sheet is coated with slurry obtained by mixing micro particles of a weakly basic ion exchange resin with a binder of 0.1 mm or less, and the sheet is formed into a sheet with a thickness of 1 mm or less. If the sheet is used, it is possible to realize a vaporization cooling sorption honeycomb which effectively utilizes the capillary force to enhance the sorption effect (FIG. 13 shows an example of a photograph of the sheet surface). +With respect to this honeycomb, when saturated steam is introduced in the desorption zone, water vapor condenses and condenses on the honeycomb surface as shown in FIG. 8. However, the condensed water is sucked in by capillary force between a plurality of micro particles overlapped in the micro particle coating layer. Also, since it is in a honeycomb shape, there is no influence on aeration. When passing through the air to be processed, as shown in FIG. 9, sorption of carbon dioxide gas and evaporation and cooling of water proceed from the inner surface of the wide honeycomb to the inside of the seat. Therefore, the disadvantage which becomes problematic in the layer (floor) filled with relatively large spherical ion exchange resin of 1 to 2 mm as in Patent Document 5 is solved.

Further, it is expected that there is a difference in sorption speed and sorption capacity on the front and back of the sheet, and unevenness in the amount of condensed water and vaporization cooling effect. However, since it is a thin sheet honeycomb, the unevenness is alleviated due to the capillary force of the condensed water on the front and back sides of the honeycomb and mass transfer due to diffusion of water vapor, and furthermore, unevenness is alleviated due to heat transfer, so performance can be improved. Furthermore, contaminants such as VOC and odor can be removed at the same time by mixing active carbon, hydrophobic zeolite and synthetic adsorbent VOC adsorbent.

Figure 11:
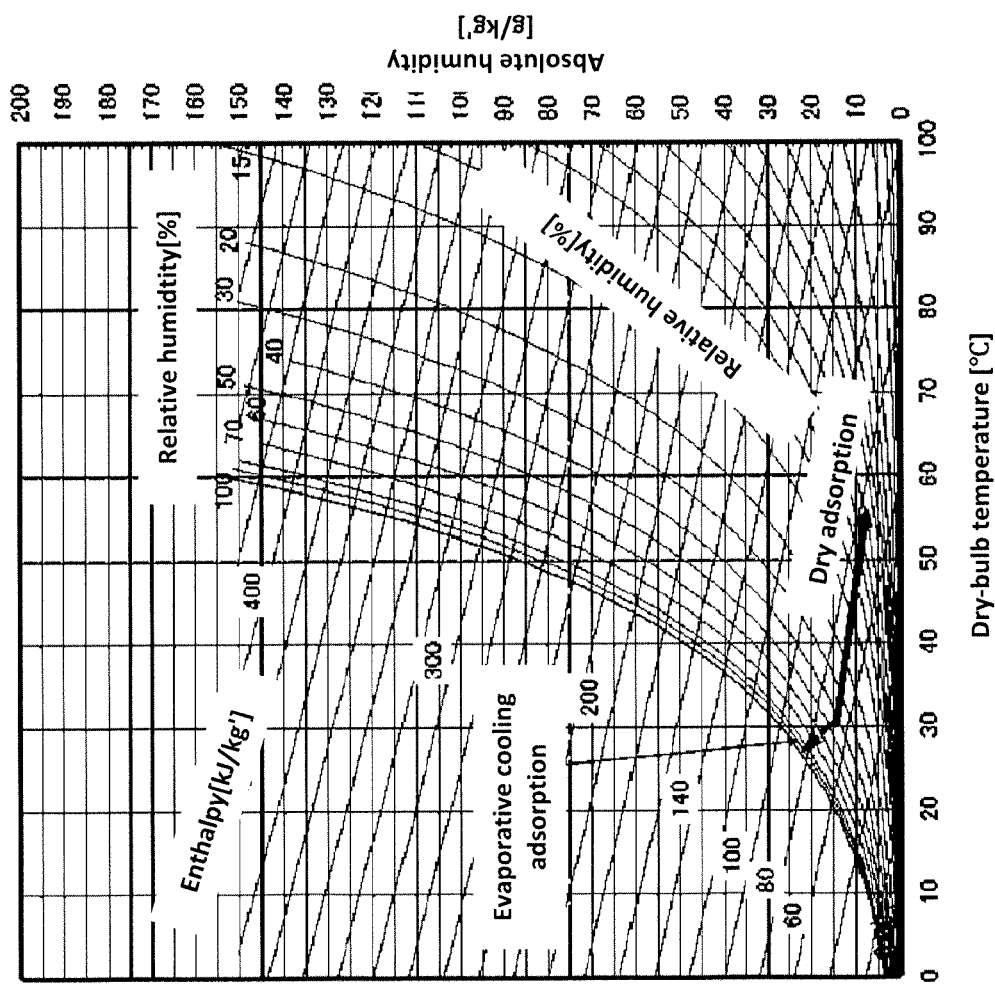
FIG. 11 is an air diagram which compared dry type adsorption with evaporative cooling sorption.

Also, as an advantage in long-term operation, there is improvement in its durability. In heat resistance, amine type carbon dioxide sorbent materials and amine type ion exchange resins can withstand up to 100° C. without oxygen. However, in some gases with oxygen, there are cases in which they are remarkably deteriorated even at 50 to 60° C. In the proposed apparatus, the temperature of the amine sorbent at the time of sorption is suppressed to a low temperature as shown in FIG. 11, and it is 40 to 100° C. or less at the time of desorption as shown in FIG. 10. However, since the ion exchange resin has higher stability in the hydrated state and is covered with dew condensation water, oxidative deterioration is prevented, and its durability is improved.

The proposed ventilating apparatus is configured as described above, and its operation will be described below. In the case where a person is in the room and the carbon dioxide concentration in the room rises due to carbon dioxide in expired air and smoking, or in the room in the winter, the carbon dioxide concentration generated by using the open type stove causes the carbon dioxide concentration rise. Therefore, it is necessary to ventilate the indoor air. In recent years, the spread of heat pump air conditioners and the advancement of smoke freezing have reduced the generation of carbon dioxide other than breath, however, the importance of ventilation remains unchanged.

Figure 3:
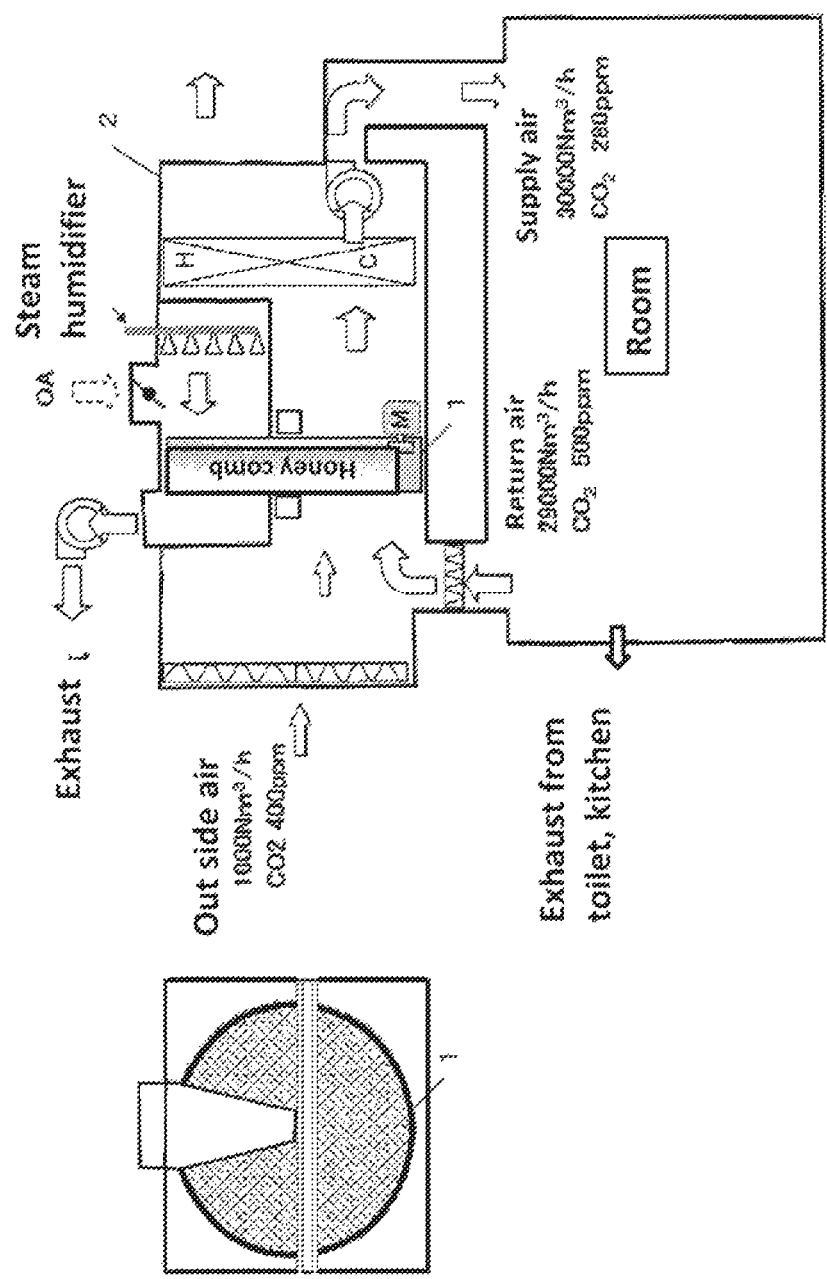
FIG. 3 is a flow of the Preferred Embodiment 1 of the proposed ventilating air conditioning apparatus.

In such a case, while rotating the honeycomb rotor 1, indoor air or outside air is passed through the ventilating air-conditioning apparatus 2. The air that has passed through the rotor is removed from contaminated gases such as carbon dioxide and then supplied. As shown in FIG. 3, when the return air from the room is passed through the honeycomb rotor of the sorption device, the concentration of carbon dioxide and pollutant contained in the return air can be reduced and the air can be supplied to the room.

At the same time, the contaminants such as carbon dioxide sorbed by introducing the saturated steam into the desorption zone is desorbed to be discharged to outside air. In this way, carbon dioxide and pollutant gases such as VOC, SOx, NOx and the like contained in the air to be processed are concentrated and discharged to the outside of the room.

Hereinafter, the embodiments of the proposed ventilating air conditioning apparatus will be described in detail with reference to FIG. 3. FIG. 3 shows a first preferred embodiment. A reference numeral 1 denotes a honeycomb rotor in which porous sheets of inorganic fibers such as glass fibers are corrugated to form in a rotor shape. In addition, an adsorbent of activated carbon on which an amine carbon dioxide absorbent is attached is carried on this rotor. The amine carbon dioxide absorbent absorbs carbon dioxide.

The rotor is divided into a process zone and a desorption regeneration zone, and the rotor is housed in a sealed casing, and the rotor is constituted to be rotationally driven by a geared motor.

The air to be processed is introduced into the process zone, contaminants such as carbon dioxide contained in the air to be processed are sorbed and removed, and the purified air is supplied to the room. The air to be processed can be either return air or outside air, and it can be mixed according to its purpose. The rotor honeycomb sorbed carbon dioxide and pollutants rotates to move to a desorption regeneration zone. In the desorption zone, saturated steam at 40 to 100° C. or less is introduced, the honeycomb is heated and the carbon dioxide and pollutants are desorbed to remove and exhaust. The saturated steam consumes energy for heating the honeycomb and desorption heat supply such as carbon dioxide, and condensation condenses on the surface inside the honeycomb. Since saturated steam has energy of ten to several tens of times of dry air, the amount of saturated steam introduced can be desorbed and regenerated with less than one tenth of the amount of the air to be processed. Therefore, as to the rotor and the apparatus, it is possible to make the whole compact. The saturated steam for desorption may be supplied from a boiler. In addition, a pan type humidifier built in the air conditioner or an electro thermal type or electrode type steam humidifier for air conditioning can be used.

Contaminants such as carbon dioxide are heated and desorbed by the saturated steam in the desorption zone, and the rotor honeycomb in which water vapor condenses rotates to move to the treatment zone again. In this zone, the dew condensation water on the inner surface of the honeycomb evaporates by the process air, thereby producing a vaporization cooling effect, the honeycomb is quickly cooled, and sorption of carbon dioxide and pollutants is started. Even after sorption is started, since the honeycomb is moist, the heat of sorption of carbon dioxide and pollutants is removed by evaporative cooling effect and is supplied at a temperature lower than the temperature of the inlet air. The proposed apparatus does not have a dehumidifying function such as a desiccant air conditioner. However, since the air to be processed is supplied by being vaporized and cooled, it functions as a cooling device.

Figure 4:
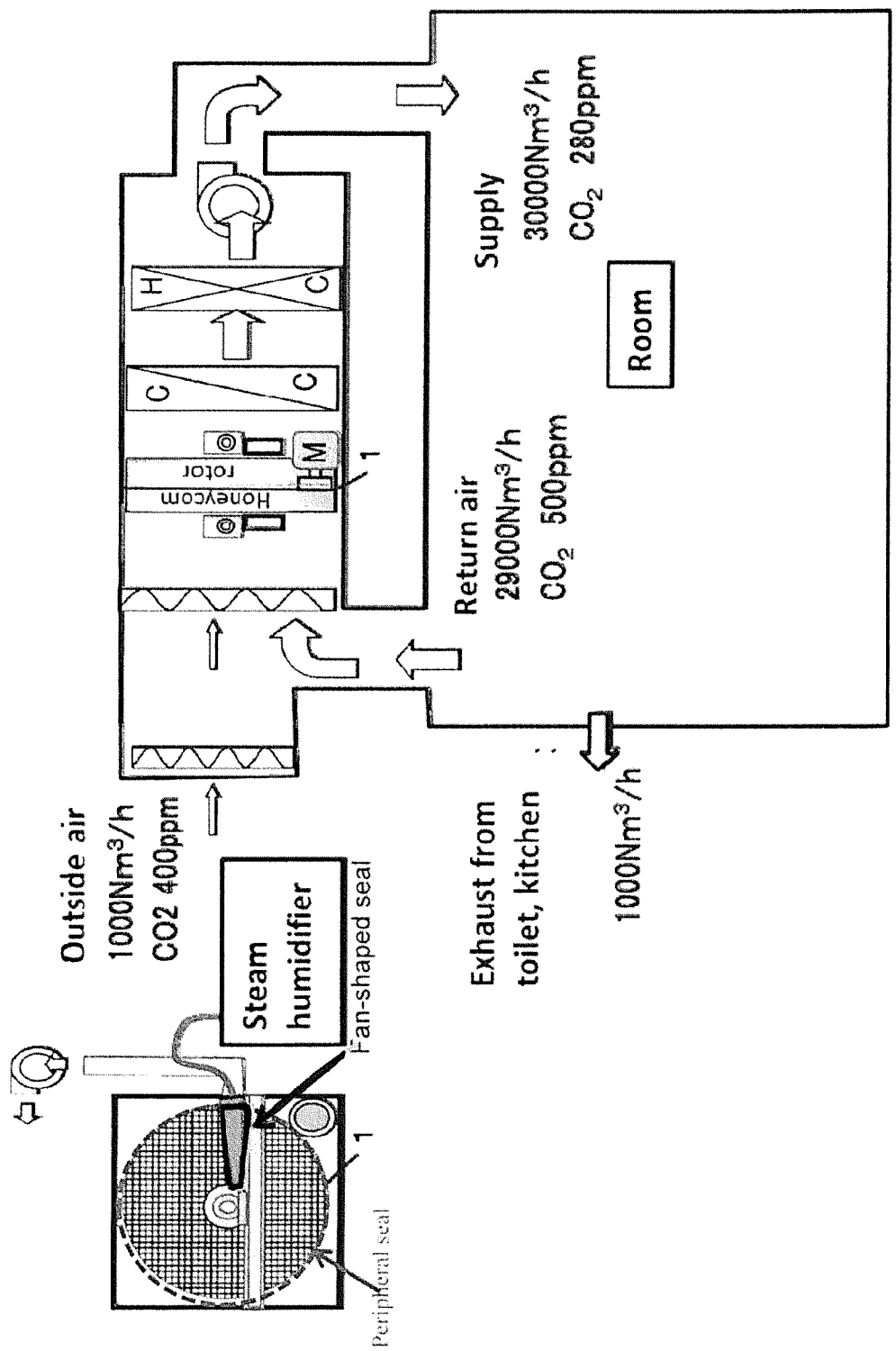
FIG. 4 is a flow of the Preferred Embodiment 2 of the proposed ventilating air conditioning apparatus.

FIG. 4 is a flow chart of a second embodiment of the inventor's proposal. The constitution of the present apparatus is almost the same as that shown in FIG. 3 of the first embodiment. FIG. 4 shows a peripheral seal and a fan-shaped (wedge-shaped) seal. The honeycomb rotor 1 is manufactured by the following procedure. Porous paper of 30 g/m 2 containing plastic fiber mainly composed of inorganic fibers such as glass fiber is prepared. The paper is coated with fine particles of an amine type ion exchange resin having a particle size distribution of 0.02 to 0.1 mm and a slurry liquid obtained by mixing activated carbon fine particles having an average particle size of 0.03 mm and a heat resistant and water resistant binder.

The coated sheet is dried (shown in FIG. 13) and corrugated in 3.0 mm pitch and 2.0 mm height. The sheet is wounded in a shape of a rotor in order to obtain a honeycomb rotor 1 having an amine type ion exchange resin and 50% by weight of fine particles of activated carbon and having a bulk density of 150 kg/m 3.

In the inventor's proposal, since steam is used for desorption of sorbed carbon dioxide, incombustibility of the honeycomb rotor 1 is unnecessary. However, in order to ensure shape retention and strength in a wet condition, it is preferable to use a paper obtained by blending inorganic fibers such as glass fibers and synthetic fibers such as PET. In addition, as long as it is a nonwoven fabric of synthetic fibers having steam resistance, shape retention and moderate strength, interposition of inorganic fibers is not indispensable. Also, as a sorbent for the condensation effect of water vapor during desorption and vaporization cooling effect upon sorption, there is a novel merit peculiar to honeycomb. For example, there is a possibility that a difference in the sorption speed, the sorption amount and the condensed water amount and an unevenness in the vaporization cooling effect have occurred on the front and back of the seat. However, since a honeycomb is formed of a thin sheet having a thickness of 1 mm or less, even if there are irregularities in sorption material in the honeycomb, temperature unevenness of inflow air and unevenness of humidity, the mass transfer due to the capillary force of the condensed water and the diffusion of water vapor and the good heat transfer are proceeded on the front and back of the seat, the unevenness is alleviated as shown in FIG. 8 and FIG. 9. Therefore, performance can be improved.

The whole of the honeycomb rotor 1 opens into the ventilating air conditioning apparatus, a hopper with a seal is installed at the front and rear of a part of the rotor, and a pipe for introducing saturated steam from the outside is provided at the inlet of the hopper. Saturated steam at 50 to 100° C. is introduced into the inlet of the hopper, and contaminants such as carbon dioxide and VOC sorbed in the honeycomb rotor are desorbed to the outlet of the hopper and discharged to the outside air. Air that has passed through the ventilating air conditioning apparatus to remove carbon dioxide and contaminants is moved into the room.

A third preferred embodiment of the inventor's proposal will now be discussed. The honeycomb rotor is manufactured by the following process. Porous paper of 35 g/m 2, which is mainly formed of inorganic fiber such as glass fiber, is corrugated to 3.0 mm pitch and 2.0 mm height. Next, it is wrapped around and formed into a rotor. Next, the polymer gel having carbon dioxide sorptivity having an amino acid group is dip coated and dried to obtain a honeycomb rotor 1 having a bulk specific gravity of 150 kg/m 3 containing 70% by weight of a carbon dioxide sorbing gel.

Figure 5:
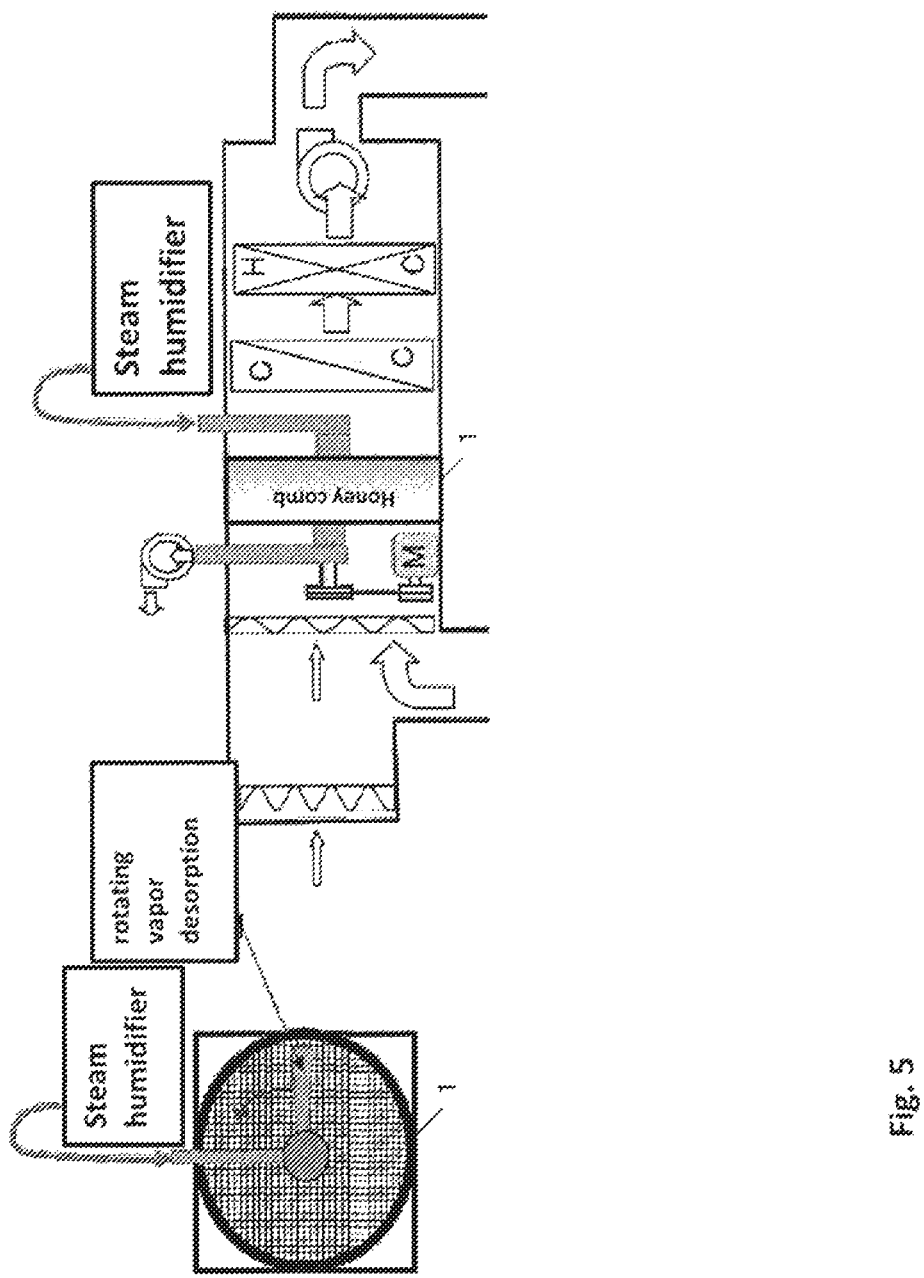
FIG. 5 is a flow of the Preferred Embodiment 3 of the proposed ventilating air conditioning apparatus.

The constitution of the third preferred embodiment of the present apparatus is almost the same as that of the second embodiment. As shown in the third embodiment of FIG. 5, in the apparatus of the third embodiment, the honeycomb rotor is fixed in a rotor suction apparatus having a peripheral seal structure, and the air to be processed is passed through the air conditioner, and the air passing through the apparatus is returned to the room again. Since the rotor is not rotated, it is easy to increase the size. Since the sliding member is only the seal of the hopper, the sliding resistance is small, an expensive sealing material having high wear resistance is unnecessary, and the maintenance cost can be reduced.

Figure 7:
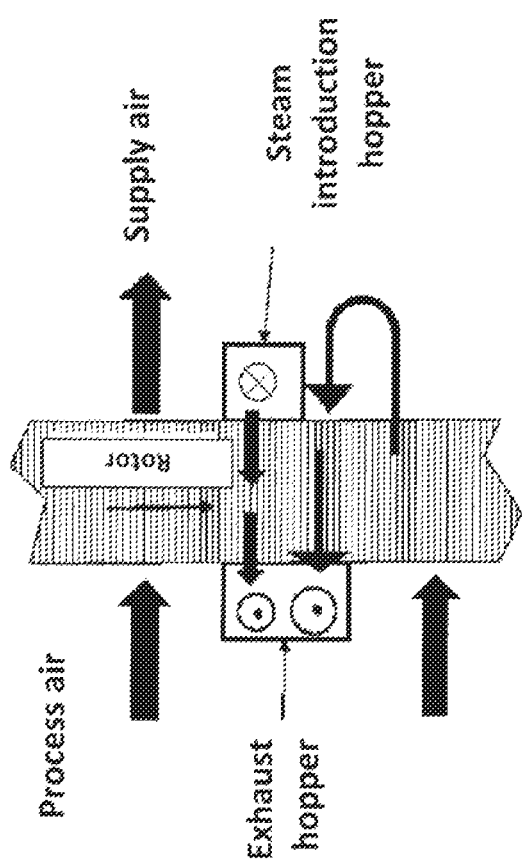
FIG. 7 is a sectional view of the steam introduction hopper and an exhaust air hopper of the Preferred Embodiment.

A fourth preferred embodiment of the inventor's proposal will now be discussed. Furthermore, it will be explained that the fourth preferred embodiment can improve energy saving and can be utilized not only in summer but also in winter. The basic construction is the same as that in FIG. 3, and as shown in FIG. 7, an exhaust zone sector portion to which a purge zone is added at the downstream side of the rotor rotation direction is provided on the outlet side of the saturated steam introduction zone. In the exhaust zone, together with the saturated steam, the air in the supply zone on the side opposite to the exhaust zone is sucked and purged by the exhaust fan and exhausted, and the air volume of the exhaust fan is switched between during cooling and heating.

Figure 12:
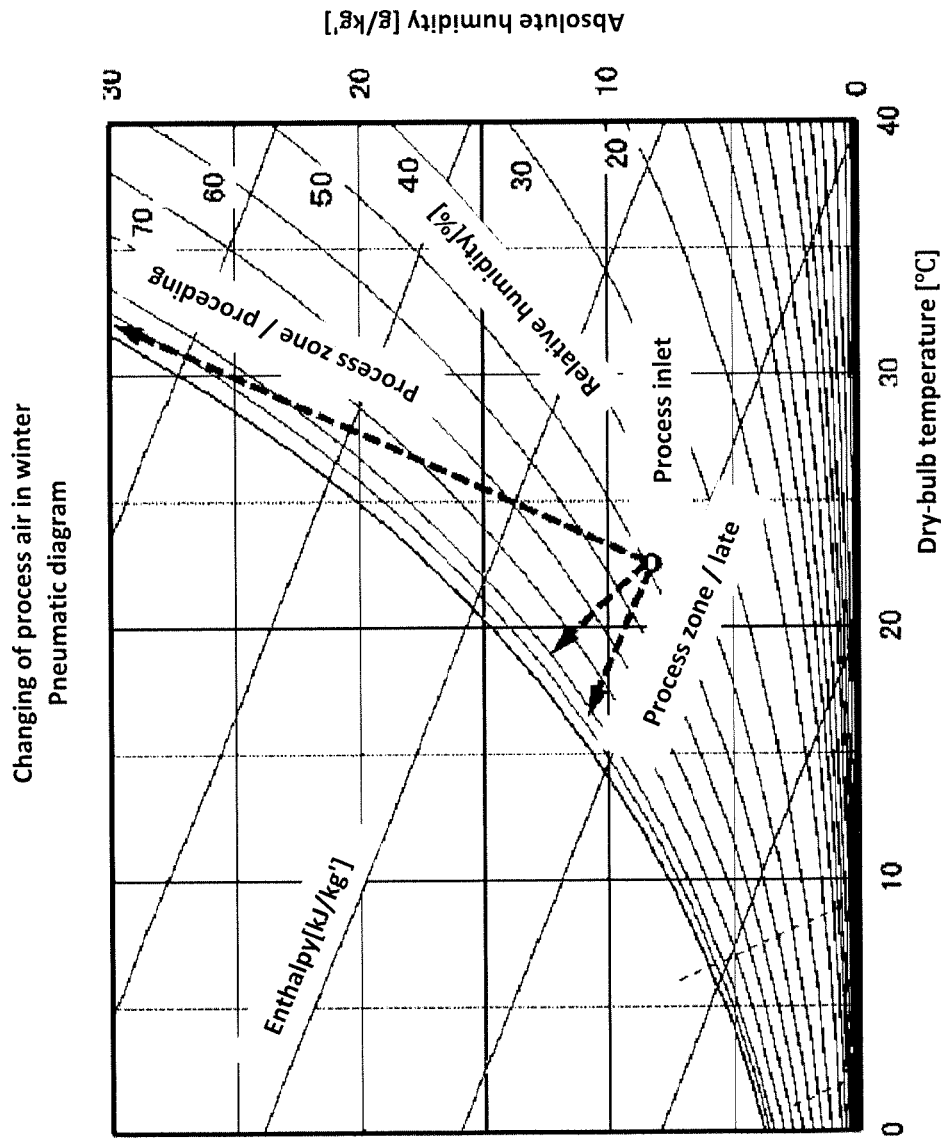
FIG. 12 is an air diagram showing change of the air to be processed in winter.

During cooling, the amount of air of the exhaust blower is increased to flow an amount of air that can sufficiently exert the pre-cooling effect, and the pre-cooling air amount is set so that the pre-cooled honeycomb moves to the process zone. By doing so, it is possible to prevent bringing the stored heat of the rotor into the supply air, and in the process zone, it is possible to supply the cooled air to be processed by the vaporization cooling effect of the condensed water. After vaporizing cooling with pre-cooled air, the rotor honeycomb that has moved to the process zone has already been cooled, enthalpy of supply does not rise and the honeycomb is moist. Therefore, since no adsorption heat is generated without dehumidification, there is no temperature rise of the supply air. As shown in FIG. 11 and FIG. 12, there is an effect that it is possible to supply air at a lower temperature than the inlet due to the vaporization cooling effect. For example, if the processing inlet air is 25° C. and 50% RH, the outlet air is vaporized and cooled to a temperature close to a wet-bulb temperature of 18° C. Further, if outside air at 35° C. and 50% RH is to be processed, it is vaporized and cooled to a temperature close to a wet-bulb temperature of 26° C. As described above, in the apparatus of the preferred embodiment, dehumidification is not performed. However, since dehumidification in this humidity region can be easily adjusted by a heat pump, there is no problem.

There is an optimum value for the amount of pre-cooled air, and it is necessary to set so that the heat capacity of the honeycomb traversing the purge zone in unit time and the heat of vaporization cooling by the air to be passed are equal. If it is too small, the accumulated heat of the honeycomb is brought into the supply air and the enthalpy rises, thereby reducing the cooling effect and the energy saving effect.

The optimum pre-cooling air flow rate W in the absence of evaporative cooling effect can be calculated by Formula—1.

$$W(kg/h) = \pi/4 \times (D^2 - d^2) \times \zeta \times L \times N \times \gamma_H \times C_H / C_G \qquad \text{Formula—1}$$

Here, D is the effective outer diameter of the rotor (m), d is the effective inner diameter of the rotor (m), $\zeta$ is the effective area of the rotor end face (area effective for ventilation), L is the rotor width (m), N is the rotor rotation speed (rph), γH is bulk density of honeycomb (kg/m 3), CG is specific heat of gas, CH is specific heat of honeycomb material.

With the inventor's proposal, since the vaporization cooling effect by the condensed water occurs, even if the air volume depends on the condition of the air to be processed, it can be the air volume of a fraction of the above calculated air volume. In the case of a honeycomb rotor dehumidifier, pre-cooled air of ⅓ to ⅙ of the air to be processed is introduced. However, in the apparatus of the preferred embodiment, the object can be achieved with cooling air of ⅓ or less of this.

In winter, the exhaust air flow rate of the exhaust fan is narrowed down, and the exhaust air flow rate is set to the minimum air flow amount for purging carbon dioxide and contaminant gas which are introduced to the process zone by the rotation of the honeycomb rotor and remain in the air gap of the honeycomb. In this way, while carbon dioxide and pollutant gas are exhausted, as shown in FIG. 12, most of the heat stored in the rotor is brought to the side of the air to be processed. Therefore, since most of the renewable energy is recovered and used for heating, it is not wasted. Also, if the ventilation is further continued in the process zone, the air to be processed is cooled by the vaporization cooling effect and supplied. However, since enthalpy of the air to be processed does not decrease and the air to be processed is only humidified, the air can be supplied by heating as much as necessary. That is, there is the effect that the necessary humidification becomes unnecessary in the winter season. Accordingly, the ventilating air conditioning apparatus that is suitable for energy-saving and can be operated even in the winter can be realized.

At the time of heating, the air volume of the exhaust blower is narrowed, and an amount of air enough to purge and discharge contaminants such as the condensed and desorbed carbon dioxide remaining in the honeycomb airspace is allowed to pass. If the purge air amount is too small, as sorbed contaminants get mixed into air supply, it is desirable to make it slightly excessive. However, when the amount is excessively large, the heat storage of the honeycomb is discharged to the outside air, and the enthalpy collected in the supply air decreases.

The optimum purge air amount QGP is calculated by Equation—2.

$$Q_{GP}(m^3/h) = \pi/4 \times (D^2 - d^2) \times \zeta \times L \times N \times \psi \qquad \text{Equation—2}$$

Here, $\psi$ is honeycomb porosity. The precooling optimum gas amount W in Equation—1 is expressed in kg/h because the heat capacity is important. However, the optimum purge air amount QGP is calculated by m 3/h since the volume is important.

If D=4, d=0.6, $\zeta$=0.8, L=0.5, N=10, $\psi$=0.8, the optimal purge amount is QGP=39.2 m 3/h. Under this condition, if purging for exhausting is not operated, 39.2 m 3/h of air with high concentration of carbon dioxide and pollutants will be mixed into the charge.

As described above, in the winter season, a purge air amount enough to purge the contaminant gas such as carbon dioxide contained in the honeycomb airspace is ventilated, and the honeycomb is operated to rotate to move to the process zone in a state where the heat storage still remains after the regeneration. Then, the heat storage of the rotor at the time of desorption and regeneration is brought into the air supply and reused for heating, therefore, the energy saving effect is improved. After the rotor has cooled, the supply air is humidified by the vaporization cooling effect and the temperature drops. However, since there is no loss of enthalpy, it is possible to supply humidified warm air by just heating a little. That is, the stored heat is recovered to contribute to heating. Moreover, it is convenient because it is humidified, and there is merit of driving even in winter. As described above, energy saving type-ventilation equipment that can be used throughout the year can be realized not only in the summer but also in the intermediate and winter.

The ventilator of the preferred embodiment is constituted as described above, and its operation will be described below. Due to carbon dioxide in the exhaled breath of people and smoking in the room, the concentration of carbon dioxide in the room rises. Also, in winter, the concentration of carbon dioxide inside the room rises due to carbon dioxide generated using an open-type stove in the room. Therefore, it is necessary to ventilate indoor air. In recent years, the spread of heat pump air conditioners and the advancement of smoking, the generation of carbon dioxide other than exhalation has decreased, but the importance of ventilation remains unchanged.

In such a case, as shown in FIG. 3, while rotating the honeycomb rotor 1, indoor air or outside air is passed through the ventilator. The air that has passed through the sorption rotor is removed from the pollutant gas such as carbon dioxide and VOC and is supplied into the room. When the return air from the room is passed through the honeycomb rotor of the ventilating apparatus, the concentration of carbon dioxide and pollutant contained in the return air can be reduced and the air can be supplied to the room.

At the same time, pollutants such as carbon dioxide sorbed by introducing saturated steam into the desorption zone are desorbed and exhausted to the outside air.

In this way, carbon dioxide and pollutant gases such as VOC, SOx, NOx and the like contained in the air to be processed are concentrated and discharged to the outside of the room. When saturated steam is introduced from the desorption zone, water vapor heats the honeycomb and supplies heat of desorption of carbon dioxide and pollutants to condense on the inner surface of the honeycomb. The dew condensation water on the inner surface of the honeycomb has a positive effect in the next process zone.

The first effect of dew condensation water is explained as follows. The honeycomb immediately after desorption has poor sorption ability at high temperature. However, because the air to be processed evaporates the condensed water on the honeycomb surface and takes away the latent heat of vaporization, it quickly cools and starts sorption.

Figure 6:
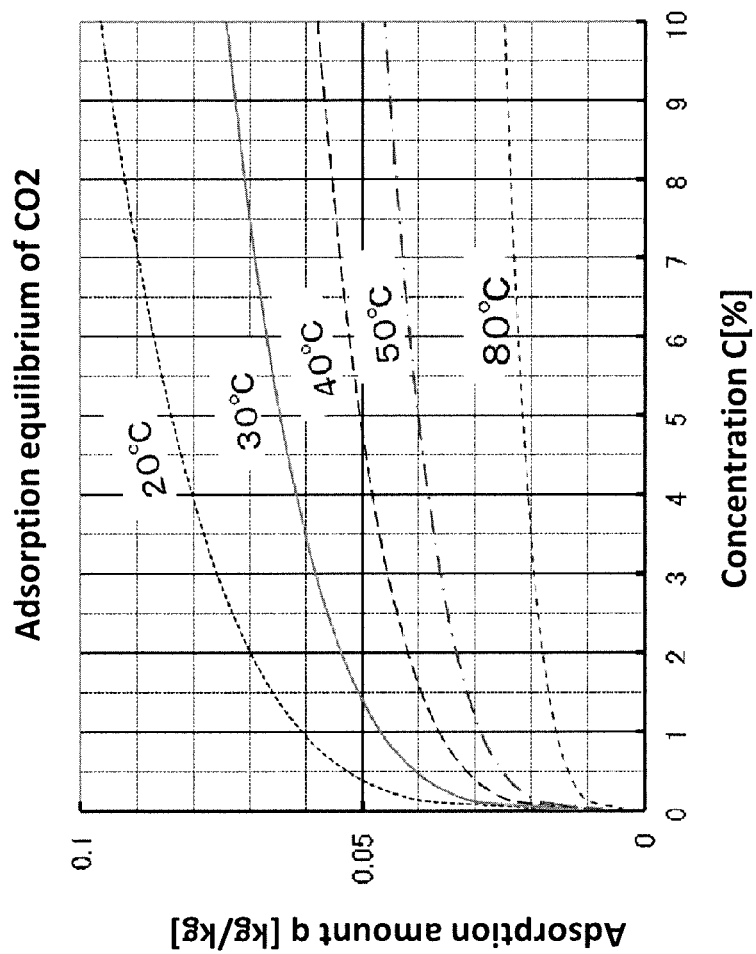
FIG. 6 is an equilibrium diagram of carbon dioxide adsorption of a solid amine sorbent.

The second effect of dew condensation water is explained as follows. Heat of sorption is generated due to sorption of pollutants such as carbon dioxide in the air to be processed. In the operation in a dry state as in Patent Documents 3, 4 and 6, air temperature rises and sorption power decreases as dry adsorption shown in FIG. 11. However, in the preferred embodiment, sorption heat is converted to latent heat by evaporative cooling of the condensed water on the surface of the honeycomb, and the temperature rise is suppressed as in vaporization cooling sorption shown in FIG. 11, and the sorption performance is improved. That is, when sorption material or raw material gas rises in temperature due to sorption heat when sorption of carbon dioxide to the honeycomb by flowing the air to be processed to the rotor, the sorption amount decreases as shown in FIG. 6.

However, according to the preferred embodiment, the temperature of the air to be processed is lowered by the vaporization cooling effect of the condensed water, and the sorption heat generated by the sorption of carbon dioxide is also removed by vaporization cooling, whereby the rise of the temperature of the honeycomb and the raw material gas is suppressed, it is possible to sorb contaminant gases such as carbon dioxide with high efficiency. For example, when outside air at 35° C. and 50% RH is introduced, the passing air and the honeycomb generate a vaporization cooling effect so as to approach the wet-bulb temperature of 26° C. at this time. In addition, if return air at 25° C. and 50% RH is used as the return air, a vaporization cooling effect is produced so that the wet-bulb temperature becomes close to 18° C.

The third effect of dew condensation water is explained as follows. Carbon dioxide sorbent materials such as amine type ion exchange resins absorb moisture by hydration of ion exchange groups. Further, since the carbon dioxide sorption capability is higher in the hygroscopic state than in the dry state, the sorption performance is also improved in that sense. In addition, the hydrated state is more stable, thus improving heat resistance and oxidation resistance. The same effect is also obtained when impregnating an amine type absorbent on activated carbon or the like, and has the effect of improving the durability of the amine type absorbent.

Oxygen in the indoor air is consumed by the person in the room, however, as described above, oxygen is present in the atmosphere by about 21%, and consumption of about 1 to 2% is not a problem in particular. However, 1-2% of carbon dioxide discharged at the same time as oxygen consumption is a fatal concentration for humans. If the inside of the room becomes a negative pressure due to discharge of pollutants such as carbon dioxide and VOC which is concentrated and desorbed, outside air enters as a draft wind from windows and doors, or oxygen is supplied by diffusion due to concentration difference. That is, the outside air is supplied in an amount substantially equal to the amount of the pollutant exhaust gas discharged to the outside of the room as a draft wind, and since there is nearly 21% of oxygen in the outside air, the oxygen amount is not insufficient.

Since the concentration of carbon dioxide in the exhaust gas of the ventilating apparatus according to the preferred embodiment is high, when the exhaust gas is guided to the growing room of a plant factory such as a vinyl house, the growth of plants becomes faster and the discharge of carbon dioxide to the atmosphere can be suppressed.

In this way, waste of energy can be reduced as compared with discharging a large amount of air to the outside of the room in order to evacuate only a few ppb to several hundred ppm of contaminants in the room. Also, if a carbon dioxide sensor is provided and saturated steam is introduced only when the carbon dioxide concentration becomes equal to or higher than a predetermined value to perform desorption and regeneration operation, further waste of energy can be prevented.

As explained above, since desorbing and regenerating by saturated water vapor are utilized, pollutants such as carbon dioxide and VOC in the room are discharged by a small amount of ventilation, and energy loss due to ventilation can be prevented. Also, even if pollutants are contained in the outside air, the amount of intrusion into the room is kept to a minimum because the amount of ventilation is small. In addition, pollutants intruding from local ventilation, doors, etc. are adsorbed and exhausted when passing through the rotor, therefore, there is no problem.

The inventor's proposals provide a ventilating air conditioning apparatus capable of releasing pollutants such as carbon dioxide and VOC in a room with a small amount of ventilation to the outside, which can be used in either summer or winter, can prevent energy loss associated with ventilation. In addition, it is possible to provide a ventilating air conditioning apparatus suitable for space-saving and energy-saving.

Although a few embodiments have been shown and described, it would be appreciated by those skilled in the art that changes may be made in these embodiments without departing from the principles and spirit of the invention, the scope of which is defined in the claims and their equivalents.

The invention claimed is:

1. A ventilating air conditioning apparatus comprising:
    a honeycomb rotor having a sorption capacity to adsorb or absorb carbon dioxide and contaminants; and
    a rotor rotation device having at least a process zone and a regeneration desorption zone, the honeycomb rotor being disposed in the rotor rotation device, wherein
    in the process zone, carbon dioxide and contaminants are removed from air to be processed by passing the air to be processed through the honeycomb rotor to generate return supply air,
    the regeneration desorption zone is configured to introduce steam into the honeycomb rotor, to desorb carbon dioxide and contaminants and to generate outdoor discharge air, and
    the honeycomb rotor is in a state, wet with condensed water, when the air to be processed enters the honeycomb rotor in the process zone.

2. A ventilating air conditioning apparatus according to claim 1, wherein
    an air introduction purge zone is provided downstream from the regeneration desorption zone in a rotating direction, on an outlet side of the regeneration desorption zone, and
    an exhaust zone is provided on a side of the honeycomb rotor opposite to the purge zone, the exhaust zone having an exhaust blower to exhaust both air supplied in the purge zone and saturated steam, using suction.

3. A ventilating air conditioning apparatus according to claim 2, wherein in a case of heating, air is introduced via the purge zone only in an amount that can purge the carbon dioxide and contaminants contained by the honeycomb rotor, and in a case of cooling, air is introduced via the purge zone in an amount to generate a heat of vaporization that is equal to or greater than a heat stored by the honeycomb rotor immediately after desorption regeneration.

4. A ventilating air conditioning apparatus according to claim 1, wherein
the honeycomb rotor carries amine ion exchange resin particles having a particle diameter of 0.1 mm or less.

5. A ventilating air conditioning apparatus according to claim 1, wherein
the honeycomb rotor supports both activated carbon particles and amine ion exchange resin particles having a diameter of 0.1 mm or less.

6. A ventilating air conditioning apparatus according to claim 1, wherein
said honeycomb rotor is formed of polymer sheets having a carbon dioxide sorption function, and
the polymer sheets have a thickness of 1 mm or less.

7. A ventilating air conditioning apparatus according to claim 1, wherein
the supply air from which carbon dioxide and contaminants have been removed is sent to a room, and
a carbon dioxide sensor is provided in the room so that saturated steam is introduced to perform a desorption regeneration operation only when the carbon dioxide sensor senses a carbon dioxide concentration equal to or higher than a predetermined value.

8. A ventilating air conditioning apparatus comprising:
a honeycomb rotor having a sorption capacity to adsorb or absorb carbon dioxide and contaminants; and
a rotor rotation device having a peripheral seal structure, the honeycomb rotor being disposed in the rotor rotation device, wherein
air to be processed is passed through the honeycomb rotor to generate supply air from which carbon dioxide and contaminants have been removed,
a flow direction device has a wedge-shaped seal that extends from an inner periphery of the honeycomb rotor to an outer periphery of the honeycomb rotor, the flow direction device having first and second hoppers respectively mounted on front and rear sides of the honeycomb rotor,
the ventilating air conditioning apparatus is configured to introduce saturated steam into the honeycomb rotor from the first hopper, and
carbon dioxide and contaminants are desorbed from the honeycomb rotor and discharged outdoors from the second hopper.

9. A ventilating air conditioning apparatus according to claim 8, wherein
an air introduction purge zone is provided downstream from the first hopper in a rotating direction, on an outlet side of the first hopper, and
an exhaust blower is provided for the second hopper, and
the second hopper exhausts both air supplied in the purge zone and saturated steam, using suction.

10. A ventilating air conditioning apparatus according to claim 9, wherein
in a case of heating, air is introduced via the purge zone only in an amount that can purge the carbon dioxide and contaminants contained by the honeycomb rotor, and in a case of cooling, air is introduced via the purge zone in an amount to generate a heat of vaporization that is equal to or greater than a heat stored by the honeycomb rotor immediately after desorption regeneration.

11. A ventilating air conditioning apparatus according to claim 8, wherein
the honeycomb rotor carries amine ion exchange resin particles having a particle diameter of 0.1 mm or less.

12. A ventilating air conditioning apparatus according to claim 8, wherein
the honeycomb rotor supports both activated carbon particles and amine ion exchange resin particles having a diameter of 0.1 mm or less.

13. A ventilating air conditioning apparatus according to claim 8, wherein
said honeycomb rotor is formed of polymer sheets having a carbon dioxide sorption function, and
the polymer sheets have a thickness of 1 mm or less.

14. A ventilating air conditioning apparatus according to claim 8, wherein
the supply air from which carbon dioxide and contaminants have been removed is sent to a room, and
a carbon dioxide sensor is provided in the room so that saturated steam is introduced to perform a desorption regeneration operation only when the carbon dioxide sensor senses a carbon dioxide concentration equal to or higher than a predetermined value.

15. A ventilating air conditioning apparatus comprising:
a honeycomb rotor having a sorption capacity to adsorb or absorb carbon dioxide and contaminants;
a support structure in which the honeycomb rotor is fixed and sealed in a stationary manner;
a rotor spindle; and
a ventilation structure having first and second hoppers provided respectively on front and rear sides of the honeycomb rotor, the first and second hoppers extending around a sector of the honeycomb rotor, the ventilation structure having a peripheral seal which peripherally interlocks the first and second hoppers, the ventilation structure rotating around the honeycomb rotor centering on the rotor spindle, wherein
air to be processed is passed through the honeycomb rotor to generate supply air from which carbon dioxide and contaminants have been removed,
the ventilating air conditioning apparatus is configured to introduce saturated steam to the honeycomb rotor from the first hopper, and
carbon dioxide and contaminants are desorbed from the honeycomb rotor and discharged from the second hopper.

16. A ventilating air conditioning apparatus according to claim 15, wherein
an air introduction purge zone is provided downstream from the first hopper in a rotating direction, on an outlet side of the first hopper, and
an exhaust blower is provided for the second hopper, and
the second hopper exhausts both air supplied in the purge zone and saturated steam, using suction.

17. A ventilating air conditioning apparatus according to claim 16, wherein
in a case of heating, air is introduced via the purge zone only in an amount that can purge the carbon dioxide and contaminants contained by the honeycomb rotor, and in a case of cooling, air is introduced via the purge zone in an amount to generate a heat of vaporization that is equal to or greater than a heat stored by the honeycomb rotor immediately after desorption regeneration.

18. A ventilating air conditioning apparatus according to claim 15, wherein
the honeycomb rotor carries amine ion exchange resin particles having a particle diameter of 0.1 mm or less.

19. A ventilating air conditioning apparatus according to claim 15, wherein
the honeycomb rotor supports both activated carbon particles and amine ion exchange resin particles having a diameter of 0.1 mm or less.

20. A ventilating air conditioning apparatus according to claim 15, wherein
said honeycomb rotor is formed of polymer sheets having a carbon dioxide sorption function, and
the polymer sheets have a thickness of 1 mm or less.

21. A ventilating air conditioning apparatus according to claim 15, wherein
the supply air from which carbon dioxide and contaminants have been removed is sent to a room, and
a carbon dioxide sensor is provided in the room so that saturated steam is introduced to perform a desorption regeneration operation only when the carbon dioxide sensor senses a carbon dioxide concentration equal to or higher than a predetermined value.

* * * * *